(12) United States Patent
LeBlanc

(10) Patent No.: US 6,338,522 B1
(45) Date of Patent: Jan. 15, 2002

(54) MESH FABRIC VEHICLE TOP SYSTEM

(76) Inventor: George LeBlanc, 2208 S. Beuamont Dr., Moses Lake, WA (US) 98837

( * ) Notice: Subject to any disclaimer, the term of this patent is extended or adjusted under 35 U.S.C. 154(b) by 0 days.

(21) Appl. No.: 09/541,112

(22) Filed: Mar. 31, 2000

(51) Int. Cl.$^7$ .................................................. B60J 7/00
(52) U.S. Cl. ............................ 296/107.01; 296/107.09; 296/107.11
(58) Field of Search ........................ 296/107.01, 107.02, 296/136, 107.09, 107.11

(56) References Cited

U.S. PATENT DOCUMENTS

| | | | | |
|---|---|---|---|---|
| 2,423,748 A | * | 7/1947 | Acheson | 296/107.09 |
| D259,340 S | * | 5/1981 | Stengel | D12/401 |
| 4,300,253 A | * | 11/1981 | Anderson | 114/361 |
| D291,676 S | * | 9/1987 | Noble | D12/405 |
| 5,788,317 A | * | 8/1998 | Nation | 296/141 |
| 5,806,906 A | * | 9/1998 | Hammond | 296/26.01 |
| 5,915,399 A | * | 6/1999 | Yang | 296/136 X |

\* cited by examiner

Primary Examiner—Stephen T. Gordon
Assistant Examiner—Jason Morrow
(74) Attorney, Agent, or Firm—Liebler, Ivey&Connor; Floy E. Ivey

(57) ABSTRACT

A vehicle top system comprising a soft top composed of a mesh material to thereby block out a portion of sunlight but allow the passage of a portion of air therethrough. The soft top may include a top section to cover at least the driver and front passenger portion of a vehicle (such as a JEEP® brand vehicle). The top section may have a front edge and side edges. The soft top may include laterally spaced apart side sections each having a vertical edge and a horizontal edge; and a rear section to cover the rear portion of a vehicle and having an edge. A tubular seam extends around at least the horizontal edge of each of the side sections and the rear section edge; at least one tube may be positioned within said tubular seam. The at least one tube may be secured to a vehicle. A plurality of fasteners may be affixed to the at least one tube. A reinforcing belt and an extrusion member may be secured along the top section front edge for attachment to a vehicle windshield flange.

23 Claims, 9 Drawing Sheets

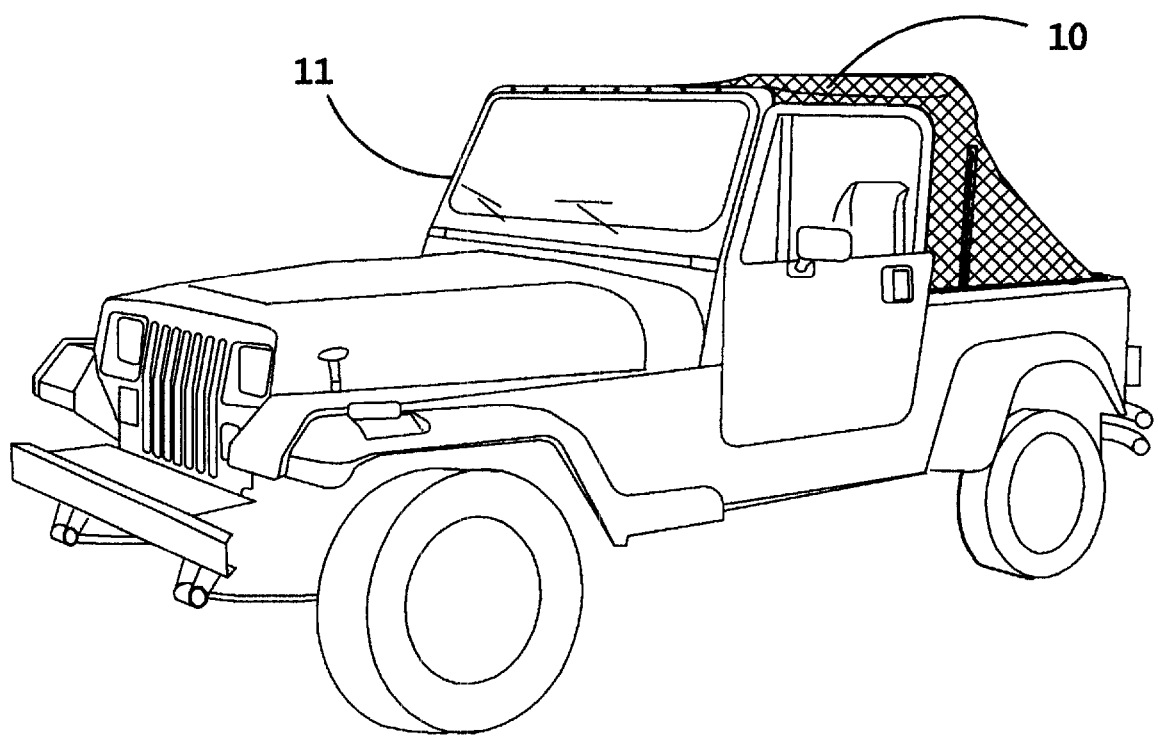
FIG. #1

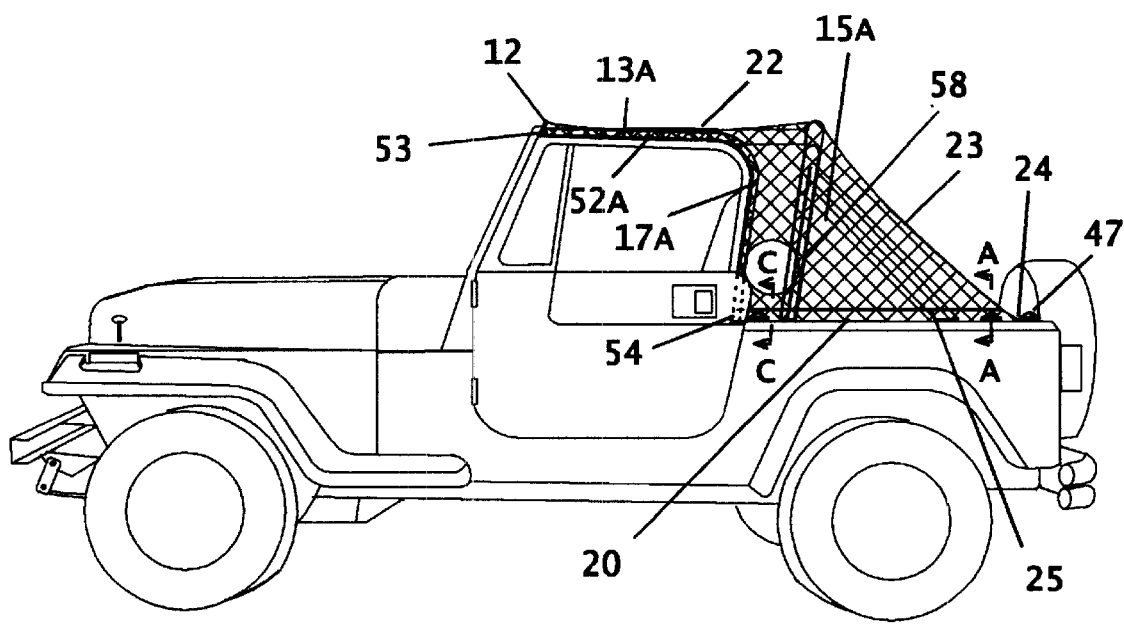
FIG. #2

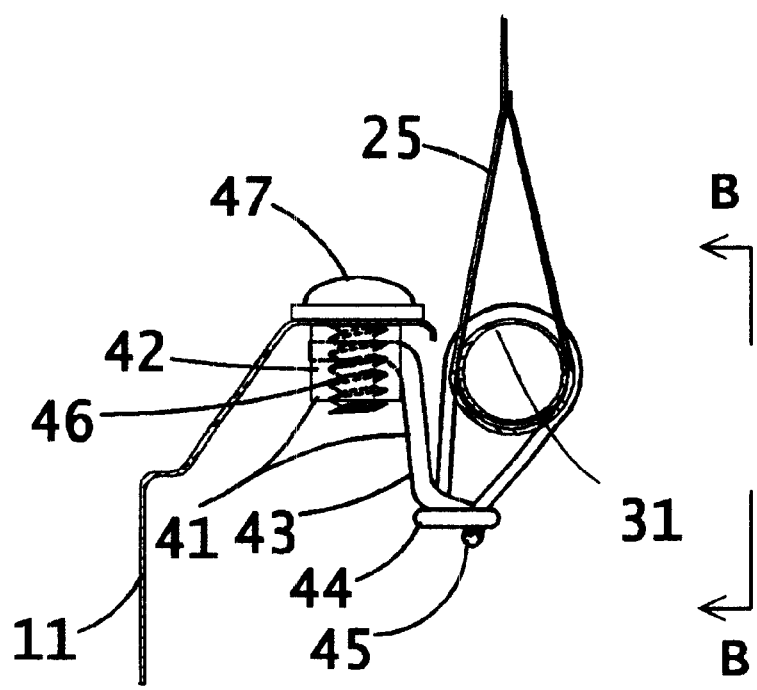
View A - A
FIG. #3
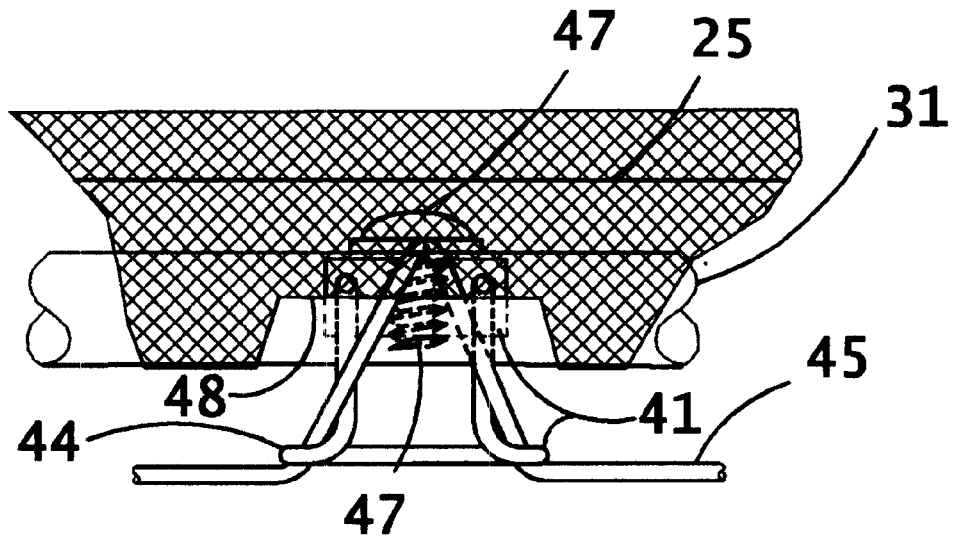
View B - B
FIG. #4

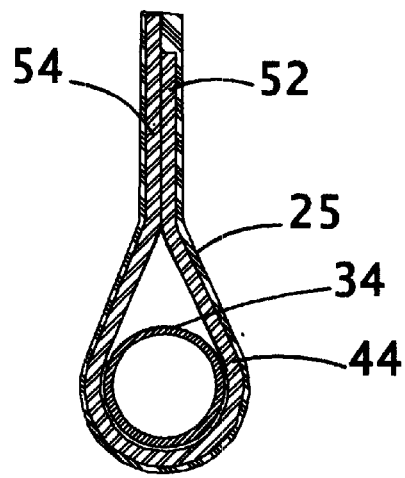
View C - C
FIG. #5
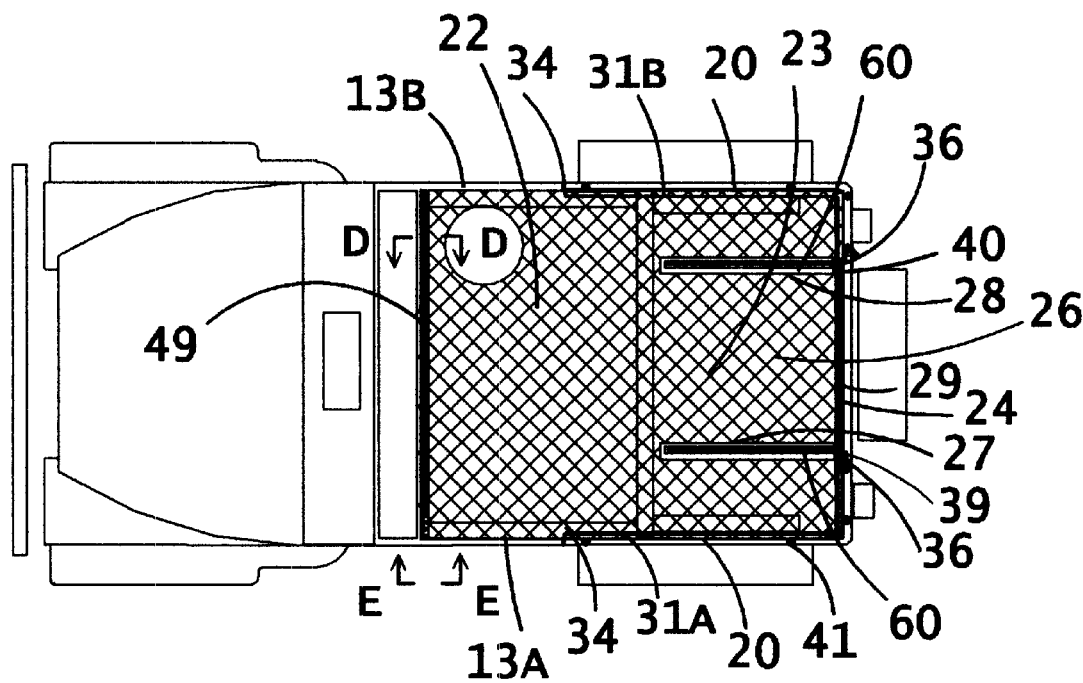
FIG. #6

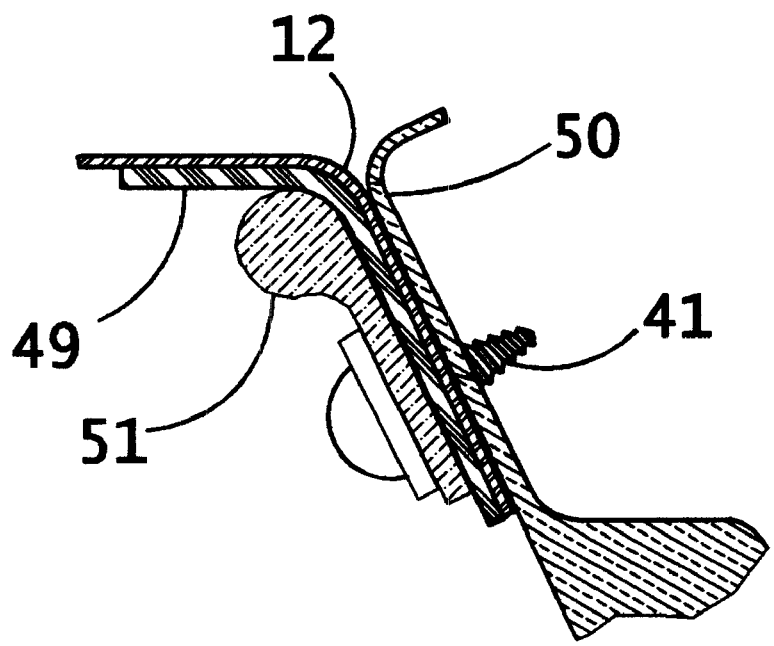
View D - D
FIG. #7
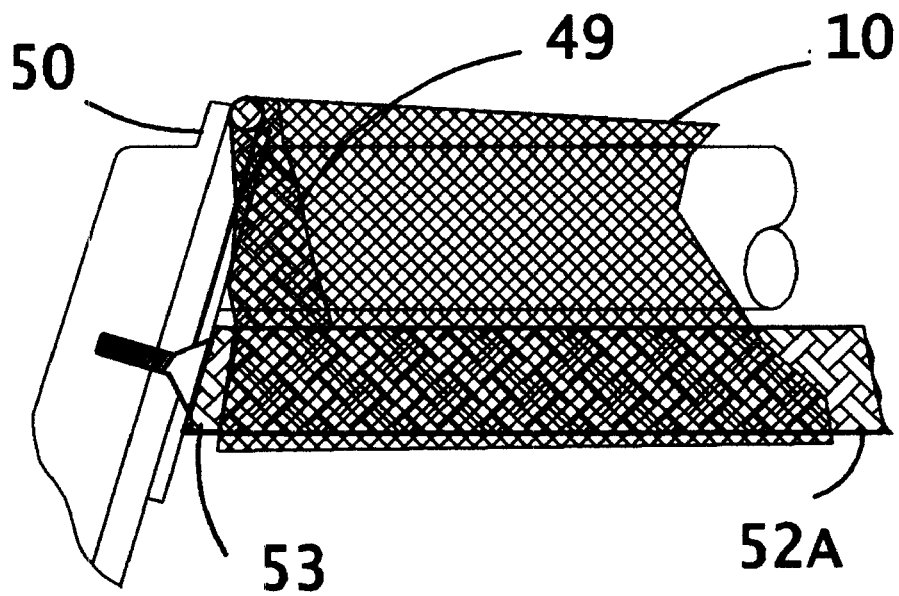
View E - E
FIG. #8

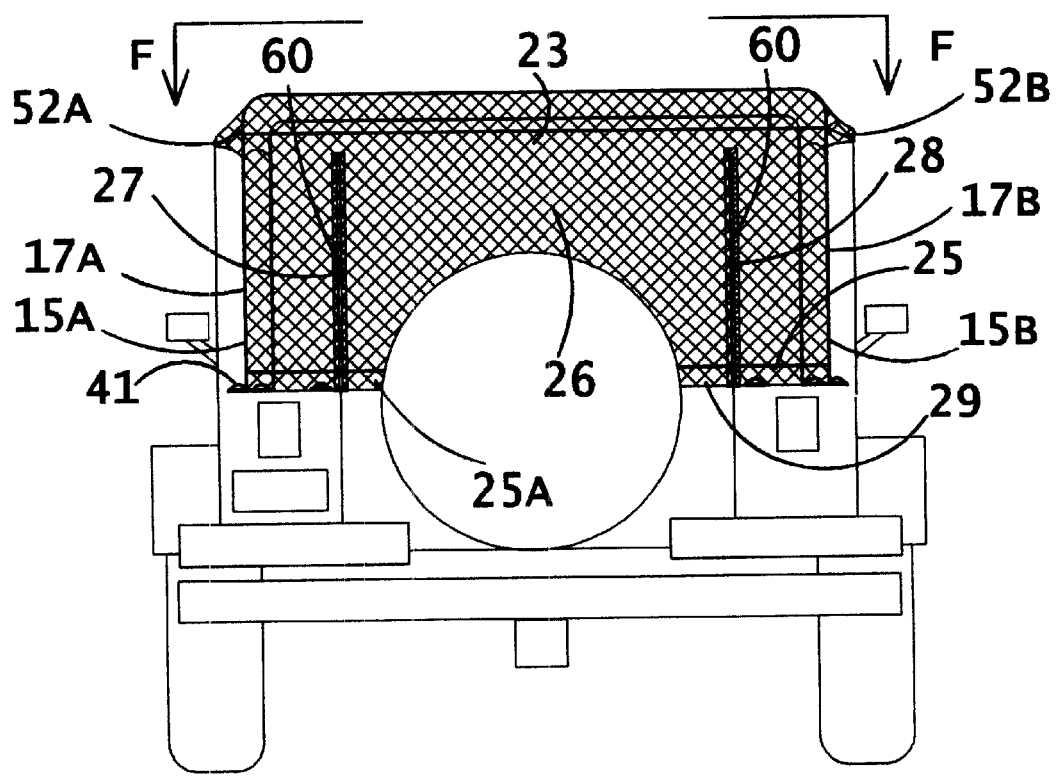
FIG. #9

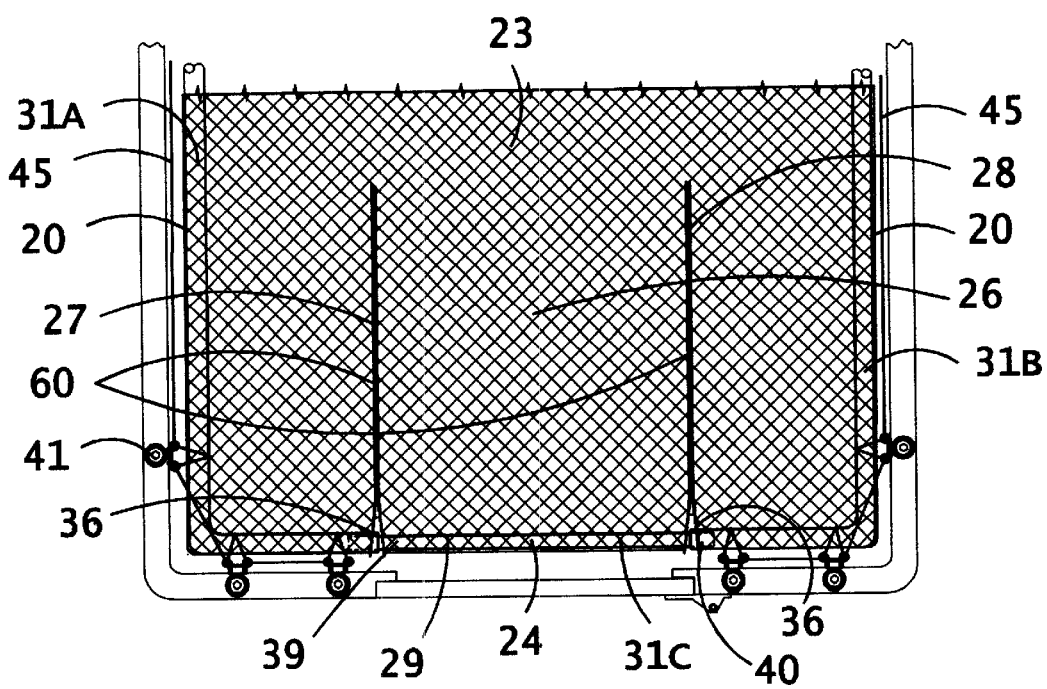
View F - F
Fig. #10

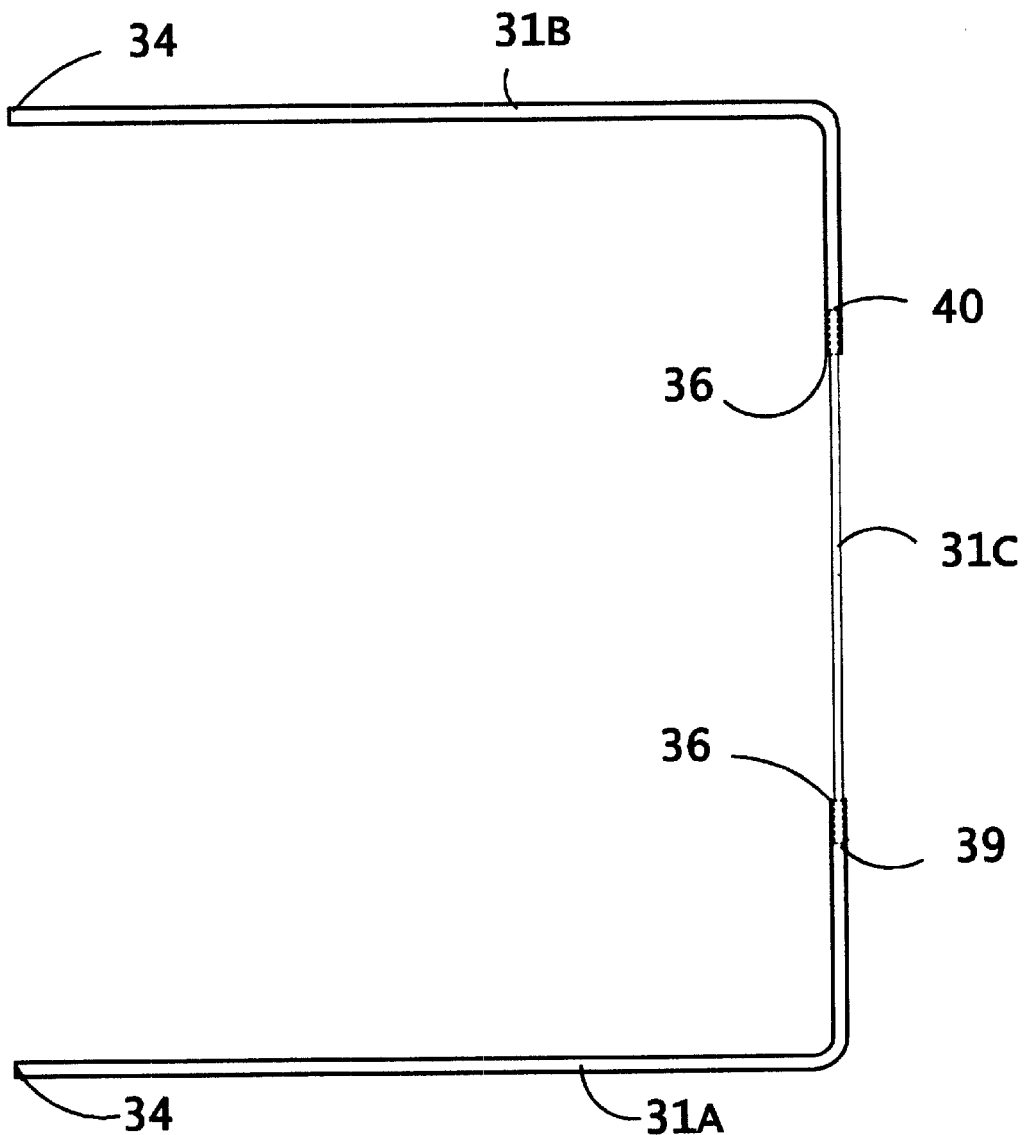
Fig. #11

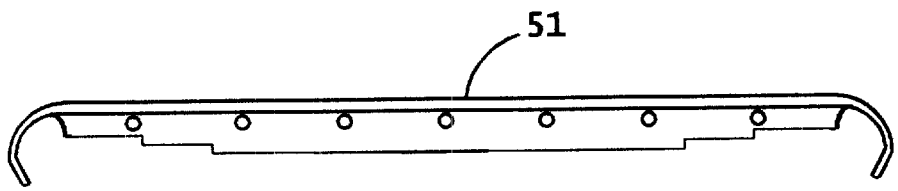
Fig. #12
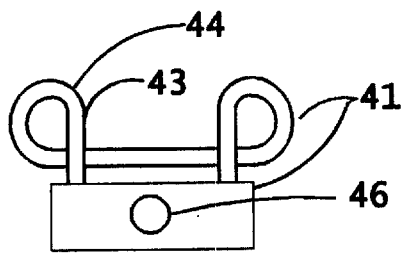
Fig. #13
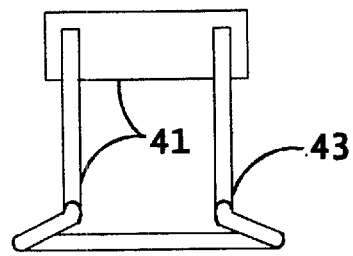
Fig. #14
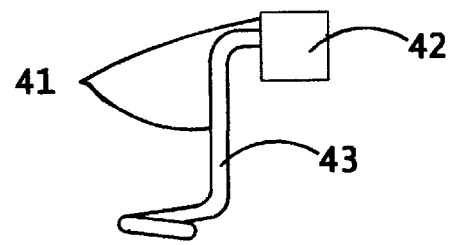
Fig. #15

MESH FABRIC VEHICLE TOP SYSTEM

FIELD OF THE INVENTION

The present invention relates generally to vehicle tops and particularly to a mesh-type soft top for a vehicle.

BACKGROUND OF THE INVENTION

Various kinds of removable soft and hard tops are available for certain vehicles including some models of automobiles and sport utility vehicles such as the JEEP® Wrangler®. However, none of these tops accomplish the result of the present invention. Typically, the tops provide an enclosure such that the wind, sunlight and other elements are excluded from the occupied portion of the vehicle except that which may enter the vehicle through windows and removable panels. If the vehicle occupants want to experience the wind and sunlight to a greater extent than what is available through the windows and removable panels, the top must be taken off or lowered. However, this may be undesirable as strong wind gusts may be felt during driving and the direct sunlight may be uncomfortable for the occupants and may cause ultraviolet damage to the vehicle interior portion.

SUMMARY OF THE INVENTION

The present invention discloses a vehicle top system. The vehicle top system may comprise a soft top composed of a mesh material to thereby block out a portion of sunlight but allow the passage of a portion of air therethrough; means may be joined to said mesh material to affix said soft top to a vehicle. The vehicle top system may be used with any type of vehicle including, but not limited to, tricks, cars, sport utility vehicles including JEEP® brand vehicles, watercraft including boats, military and farm vehicles or machines, carts including golf carts.

In one embodiment, the mesh material may be composed of a plurality of ultraviolet stabilized synthetic strands. Said plurality of ultraviolet stabilized synthetic strands may be composed of a material selected from the group consisting of polyester and polyethylene. In an alternative embodiment, a vinyl coat may surround said plurality of ultraviolet stabilized synthetic strands. The term "strand" is meant to include, but is not limited to, both fiber and yarn. The mesh material may be, but is not limited to, an open weave or knit.

In one alternative embodiment of the vehicle top system, said soft top may be composed of a top section to cover at least the driver and front passenger portion of a vehicle (such as a JEEP® brand vehicle as depicted in the figures), said top section may have a front edge and side edges; laterally spaced apart side sections each having a vertical edge and a horizontal edge; and a rear section to cover the rear portion of a vehicle, said rear section having an edge.

The vehicle top system may further comprise a tubular seam extending around at least the horizontal edge of each of the side sections and the rear section edge; at least one tube may be positioned within said tubular seam. The at least one tube may be secured to a vehicle (rather than the mesh material directly) which thereby minimizes the point stresses on the mesh and enhances the life of the top as the tie-down forces are uniformly applied to the mesh along the length of the tubing. A further advantage of using the tubing is that the number of anchor points from the mesh top to the vehicle may be minimized because of the spanning strength of the tube.

The vehicle top system may further comprise a plurality of fasteners affixed to said at least one tube.

In an alternative embodiment, each fastener may be composed of a base portion and a rod portion extending from the base portion, said rod portion having at least one loop to receive a connection means, said base portion including means for attachment to a vehicle. In the preferred embodiment, said rod portion has two loops.

The connection means may be threaded through said at least one loop on each of said fasteners, to thereby receive the at least one tube. Said connection means may include, but is not limited to, at least one cord, strand, wire, rope, tie-wrap, strap and buckle, or any other means. Said attachment means includes, but is not limited to, a bore having female threads to receive the male threads of a bolt through a vehicle panel portion or flange.

In another embodiment, the vehicle top system may further comprise a reinforcing belt that may be secured along the top section front edge, e.g., by thread, and includes means for attachment to a vehicle windshield flange. Said means for attachment to a vehicle windshield flange may include at least one aperture to receive at least one bolt, screw, fastener or the like.

The vehicle top system may further comprised of an extrusion member having a rounded surface juxtaposed the top section front edge to thereby provide added support and relieve stress when the top section front edge is affixed to a vehicle windshield flange, said extrusion member including means for attachment to a vehicle windshield flange which may include, but is not limited to, at least one aperture to thereby receive at least one bolt, screw, fastener or the like.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is a perspective view of an exemplary motor vehicle along with the vehicle top system.

FIG. 2 is a side view of an exemplary motor vehicle showing the vehicle top system.

FIG. 3 is an exploded section view along A—A of a fastener showing the base portion, rod portion, a cord, and the tubes.

FIG. 4 is an exploded section view along B—B showing a fastener, base portion, rod portion, a cord, and the tubes.

FIG. 5 is an exploded section view along C—C showing the tubular seam, tubing, and belt member.

FIG. 6 is a top view showing the top section, rear section, flap portion, reinforcing belt, and tubes.

FIG. 7 is an exploded section view along D—D showing the windshield flange, top section front edge, reinforcing belt, and the extrusion member.

FIG. 8 is side section view along E—E showing the belt member, reinforcing belt, top section side edge, and extrusion member.

FIG. 9 is a back view showing the rear section, flap portion, and flap portion horizontal edge.

FIG. 10 is a top view along F—F showing the rear section, tubes, fasteners, cord, and flap portion.

FIG. 11 is a view of tubes showing the two L-shaped lateral tubes, and the rear tube.

FIG. 12 is a view of the extrusion member.

FIG. 13 is a top view of the fastener showing the base portion, rod portion including two loops.

FIG. 14 is a lateral view of the fastener.

FIG. 15 is an end view of the fastener.

DETAILED DESCRIPTION OF THE PREFERRED EMBODIMENT(S)

The vehicle top system 10 disclosed herein is shown in FIGS. 1–15 wherein the vehicle top system 10 may comprise a soft top composed of a mesh material to thereby block out a portion of sunlight but allow the passage a portion of air therethrough; means may be joined to said mesh material to affix said soft top to a vehicle 11. The vehicle top system 10 may be used with any type of vehicle 11 including, but not limited to, trucks, cars, sport utility vehicles, watercraft including boats, carts including golf carts, military and farm vehicles or machines, as well as JEEP® brand vehicles.

In one embodiment, the mesh material may be composed of a plurality of ultraviolet stabilized synthetic strands. Said plurality of ultraviolet stabilized synthetic strands may be composed of a material selected from the group consisting of polyester and polyethylene. In an alternative embodiment, a vinyl coat may surround said plurality of ultraviolet stabilized synthetic strands. The term "strand" is meant to include, but is not limited to, both fiber and yarn. The mesh material may be, but is not limited to, an open weave or knit.

In one alternative embodiment of the vehicle top system 10, said soft top may be composed of a top section 22 to cover at least the driver and front passenger portion of a vehicle 11 (such as a JEEP® brand vehicle 11 as depicted in the figures), said top section 22 may have a front edge 12 and side edges 13A, 13B; laterally spaced apart side sections 15A, 15B each having a vertical edge 17 and a horizontal edge 20; and a rear section 23 to cover the rear portion of a vehicle 11, said rear section 23 having an edge 24.

The vehicle top system 10 may further comprise a tubular seam 25 extending around at least the horizontal edge of each of the side sections 15A, 15B and the rear section edge 24; at least one tube 31 may be positioned within said tubular seam 25. The at least one tube may be secured to a vehicle 11 (rather than the mesh material directly) which thereby minimizes the point stresses on the mesh and enhances the life of the top as the tie-down forces are uniformly applied to the mesh along the length of the tubing. A further advantage of using the at least one tube is that the number of anchor points from the mesh to the vehicle 11 may be minimized because of the spanning strength of the at least one tube.

In another embodiment of the vehicle top system 10, the soft top rear section 23 may be composed of a flap portion 26 affixed to said rear section, said flap portion 26 having a first vertical edge 27, a second vertical edge 28, and a horizontal edge 29 extending therebetween with the tubular seam 25 extending along said flap horizontal edge 29. Said flap portion 26 may be affixed by zippers 60, snaps or other means. The flap portion 26 may be rolled up and lashed proximal the top section 22 to thereby allow access to the rear of the vehicle 11 and, as in the case of a JEEP® brand vehicle 11 as depicted in the figures, to thereby allow an open overhead to allow a passenger to sit on the back seat (not shown). The flap portion 26 may be lashed in multiple places proximal the top section 22 using a removable cord(s) (not shown) threaded through the mesh and around the horizontal roll bar.

In an alternative embodiment, said at least one tube may be composed of two L-shaped lateral tubes 31A, 31B each having a front end 34 and rear end 36; and a rear tube 31C having a first end 39 and a second end 40; each L-shaped lateral tube may be positioned within the tubular seam 25 at one of the side sections 15A, 15B with each L-shaped lateral tube rear end positioned within the tubular seam 25 at the rear section 23 proximal one of the flap portion 26 first or second vertical edges 27, 28 and each L-shaped lateral tube front end 34 positioned within the tubular seam 25 proximal one of the side section vertical edges 17A, 17B. Said rear tube 31 C may be positioned within at least the tubular seam at the flap portion 25A and said rear tube first and second ends 39, 40 may be removably positioned within each of said L-shaped lateral tube rear ends 36 respectively to thereby secure the flap 26 when closed and allow the flap 26 to be opened when the rear tube 31C is removed.

The vehicle top system 10 may further comprise a plurality of fasteners 41 affixed to said at least one tube 31.

In an alternative embodiment, each fastener 41 may be composed of a base portion 42 and a rod portion 43 extending from the base portion 42, said rod portion 43 having at least one loop 44 to receive a connection means 45, said base portion 42 including means for attachment to a vehicle 11. In the preferred embodiment, said rod portion 43 has two loops 44.

The connection means 45 may be threaded through said at least one loop 44 on each of said fasteners 41, to thereby receive the at least one tube. Said connection means 45 may include, but is not limited to, at least one cord, strand, wire, rope, tie-wrap, strap and buckle, or any other means. Said attachment means 46 includes, but is not limited to, a bore in said base portion 42 having female threads to receive the male threads of a bolt 47 through a vehicle panel portion or flange. Said attachment means 46 may further include a bore to receive a pin, screw, or the like. Said base portion 42 may also be welded to a vehicle panel portion or flange.

The vehicle top system 10 may further comprise a plurality of cutouts 48 formed within the tubular seam 25 at the location of each fastener 41 to thereby facilitate access to connect said fasteners 41 to said at least one tube.

In another embodiment, the vehicle top system 10 may further comprise a reinforcing belt 49 that may be secured along the top section front edge 12, e.g., by thread, and includes means for attachment to a vehicle windshield flange 50. Said means for attachment to a vehicle windshield flange 50 may include at least one aperture to receive at least one bolt, screw, fastener or the like.

The vehicle top system 10 may further comprise an extrusion member 51 having a rounded surface juxtaposed the top section front edge 12 to thereby provide added support and relieve stress when the top section front edge 12 is affixed to a vehicle windshield flange 50, said extrusion member 51 including means for attachment to a vehicle windshield flange 50 which may include, but is not limited to, at least one aperture to thereby receive at least one bolt, screw, fastener or the like.

The vehicle top system 10 may further comprise belt members 52A, 52B fastened to at least each of the side edges 13A, 13B of the top section 22 respectively, e.g., by threads, each belt member 52 having a first end 53 and a second end 54, each first end 53 having means for attachment to a windshield flange 50 which may include, but is not limited to, at least one aperture to thereby receive at least one bolt, screw, fastener or the like.

In an alternative embodiment of the vehicle top system 10, each belt member 52A, 52B is fastened to one of the top section side edges 13A, 13B and to one of the vertical edges 17 of each side section; each belt member second end 54 includes means for attachment to proximal one of the L-shaped lateral tube front ends. As best shown in FIG. 5, each belt may be placed within a tubular seam 25 of said mesh material and may comprise a loop 44 to surround one of the L-shaped lateral tubes 31 A, 31 B proximal one of the L-shaped lateral tube front ends 34. In alternative embodiments, said belt members 52A, 52B may be an elastic or rigid cord, rope, or the like.

In an alternative embodiment, the vehicle top system 10 may further comprise at least one zipper 58 vertically positioned on each side section to thereby facilitate manufacture of the vehicle top system 10.

The fastening system described herein including the fasteners 41, at least one tube, connection means 45, and means for attachment to a vehicle 11 is not meant to be limited to the mesh material described herein but may be used with any other tops including, but not limited to, soft tops, screens, or the like.

To install the vehicle top system 10 on a JEEP® brand vehicle 11, of the vintage and roll bar configuration disclosed in the drawings, the vehicle top system 10 may be placed atop the vehicle driver and passenger compartment and roll-bar configuration. The top section front edge 12 and reinforcing belt 49 may be positioned in between a windshield flange 50 and the extrusion member 51. Fasteners 41 such as bolts or screws or OEM fasteners may then secure the top section front edge 12 and extrusion member 51 to the windshield flange 50. The at least one tube may then be secured to the underside of the upper inside edge of the vehicle side panel flanges via the fasteners 41 with bolts, screws, pins, OEM fasteners, or the like. Connection means 45 may then be tightened to ensure a secure connection of the at least one tube to said fasteners 41. If the connection means 45 is a cord, strand, or the like, knots may be formed at the connection means ends. Each belt member first end may be secured to the windshield flange 50 via a bolt, screw, or OEM fastener and each belt member second end may be secured when the tube is pulled into position by the connection means 45. This is the preferred sequence for the installation steps but they may be done in other sequences.

While a preferred embodiment of the present invention has been shown and described, it will be apparent to those skilled in the art that many changes and modifications may be made without departing from the invention in its broader aspects. For example, the vehicle top system 10 is not limited to a particular shape, configuration, or use with a particular kind of vehicle. The appended claims are therefore intended to cover all such changes and modifications as fall within the true spirit and scope of the invention.

I claim:

1. A vehicle top system which comprises:
   a. soft top composed of a mesh material to thereby block out a portion of sunlight but allow the passage of a portion of air there through;
   b. means joined to said mesh material to affix said soft top to a vehicle;
   c. said soft top is composed of a top section to cover at least the driver and front passenger portion of a vehicle, said top section having a front edge and side edges; laterally spaced apart side sections each having a vertical edge and a horizontal edge; and a rear section to cover the rear portion of a vehicle, said rear section having an edge;
   d. a tubular seam extending around at least the horizontal edge of each of the side sections and the rear section edge;
   e. at least one tube positioned within said tubular seam.

2. The vehicle top system of claim 1 wherein:
   a. the soft top rear section is composed of a flap portion affixed to said rear section, said flap portion leaving a first vertical edge, a second vertical edge, and a horizontal edge extending there between with said tubular seam extending along said flap horizontal edge.

3. The vehicle top system of claim 2 wherein:
   a. said at least one tube is composed of two L-shaped lateral tubes each having a front end and a rear end; and a rear tube having a first end and a second end;
   b. each L-shaped lateral tube is positioned within the tubular seam at one of the side sections with each L-shaped lateral tube rear end positioned within the tubular seam at the rear section proximal one of the flap portion first or second vertical edges and each L-shaped lateral tube front end positioned within the tubular seam proximal one of the side section vertical edges;
   c. said rear tube is positioned within at least the tubular seam at said flap section and said rear tube first and second ends are removably positioned within each of said L-shaped lateral tube rear ends respectively.

4. The vehicle top system of claim 2 further comprising:
   a. a plurality of fasteners affixed to said at least one tube.

5. The vehicle top system of claim 4 wherein:
   a. each fastener is composed of a base portion and a rod portion extending from the base portion, said rod portion having at least one loop to receive a connection means, said base portion including means for attachment to a vehicle.

6. The vehicle top system of claim 5 further comprising:
   a. connection means threaded through said at least one loop on each of said fasteners, to thereby receive the at least one tube.

7. The vehicle top system of claim 4 further comprising:
   a. a plurality of cutouts formed within the tubular seam at each fastener to thereby facilitate access to connect said fasteners to said at least one tube.

8. The vehicle top system of claim 1 further comprising:
   a. a reinforcing belt secured along the top section front edge and including means for attachment to a vehicle windshield flange.

9. The vehicle top system of claim 1 further comprising:
   a. an extrusion member having a rounded surface juxtaposed the top section front edge to thereby provide added support and relieve stress when the top section front edge is affixed to a vehicle windshield flange, said extrusion member including means for attachment to a vehicle windshield flange.

10. The vehicle top system of claim 9 further comprising:
    a. an extrusion member having a rounded surface juxtaposed the top section front edge to thereby provide added support and relieve stress when the top section front edge and the extrusion member are affixed to a vehicle windshield flange, said extrusion member including means for attachment to a vehicle windshield flange.

11. The vehicle top system of claim 1 further comprising:
    a. belt members fastened to at least each of the side edges of the top section, each belt member having a first end and a second end, each first end having means for attachment to a windshield flange.

12. The vehicle top system of claim 11 wherein:
    a. each belt member is fastened to one of the top section side edges and to one of the side section vertical edges;
    b. said at least one tube is composed of two L-shaped lateral tubes each having a front end and a rear end; and a rear tube having a first end and a second end;

c. each belt member second end includes means for attachment proximal one of the L-shaped lateral tube front ends.

13. A vehicle top system which comprises:

a. a top;

b. means joined to said top to affix said top to a vehicle;

c. said top is composed of a top section to cover at least the driver and front passenger portion of a vehicle, said top section having a front edge and side edges; laterally spaced apart side sections each having a vertical edge and a horizontal edge; and a rear section to cover the rear portion of a vehicle, said rear section having an edge;

d. a tubular seam extending around at least the horizontal edge of each of the side sections and the rear section edge;

e. at least one tube positioned within said tubular seam.

14. The vehicle top system of claim 13 wherein:

a. the top rear section is composed of a flap portion affixed to said rear section, said flap portion having a first vertical edge, a second vertical edge, and a horizontal edge extending there between with said tubular seam extending along said flap horizontal edge.

15. The vehicle top system of claim 14 wherein:

a. said at least one tube is composed of two L-shaped lateral tubes each having a front end and a rear end; and a rear tube having a first end and a second end;

b. each L-shaped lateral tube is positioned within the tubular scam at one of the side sections with each L-shaped lateral tube rear end positioned within the tubular seam at the rear section proximal one of the flap portion first or second vertical edges and each L-shaped lateral tube front end positioned within the tubular seam proximal one of the side section vertical edges;

c. said rear tube is positioned within at least the tubular scam at said flap section and said rear tube first and second ends are removably positioned within each of said L-shaped lateral tube rear ends respectively.

16. The vehicle top system of claim 14 further comprising:

a. a plurality of fasteners affixed to said at least one tube.

17. The vehicle top system of claim 16 wherein:

a. each fastener is composed of a base portion and a rod portion extending from the base portion, said rod portion having at least one loop to receive a connection means, said base portion including means for attachment to a vehicle.

18. The vehicle top system of claim 17 further comprising:

a. connection means threaded through said at least one loop on each of said fasteners, to thereby receive the at least one tube.

19. The vehicle top system of claim 16 further comprising:

a. a plurality of cutouts formed within the tubular seam at each fastener to thereby facilitate access to connect said fasteners to said at least one tube.

20. The vehicle top system of claim 13 further comprising:

a. an extrusion member having a rounded surface juxtaposed the top section front edge to thereby provide added support and relieve stress when the top section front edge is affixed to a vehicle windshield flange, said extrusion member including means for attachment to a vehicle windshield flange.

21. The vehicle top system of claim 13 further comprising:

a. a reinforcing belt secured along the top section front edge and including means for attachment to a vehicle windshield flange;

b. an extrusion member having a rounded surface juxtaposed the top section front edge to thereby provide added support and relieve stress when the top section front edge and the extrusion member are affixed to a vehicle windshield flange, said extrusion member including means for attachment to a vehicle windshield flange.

22. The vehicle top system of claim 13 further comprising:

a. a belt member fastened to at least each of the side edges of the top section, each belt member having a first end and a second end, each first end having means for attachment to a windshield flange.

23. The vehicle top system of claim 22 wherein:

a. each belt member is fastened to one of the top section side edges and to one of the side section vertical edges;

b. each belt member second end includes means for attachment proximal one of the L-shaped lateral tube front ends.

\* \* \* \* \*